US012098824B1

(12) United States Patent
Xu et al.

(10) Patent No.: US 12,098,824 B1
(45) Date of Patent: Sep. 24, 2024

(54) LED LAMP AND LAMP HOLDER ASSEMBLY

(71) Applicant: SHENZHEN SNC OPTO ELECTRONIC CO., LTD, Shenzhen (CN)

(72) Inventors: Jianyong Xu, Shenzhen (CN); Yuqiang Zhong, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/406,938

(22) Filed: Jan. 8, 2024

(30) Foreign Application Priority Data

Oct. 16, 2023 (CN) ........................ 202322769902.9

(51) Int. Cl.

| | |
|---|---|
| ***F21V 19/00*** | (2006.01) |
| ***F21V 17/10*** | (2006.01) |
| ***F21V 17/18*** | (2006.01) |
| ***F21V 19/04*** | (2006.01) |
| ***F21Y 115/10*** | (2016.01) |

(52) U.S. Cl.
CPC .......... *F21V 19/003* (2013.01); *F21V 17/105* (2013.01); *F21V 17/18* (2013.01); *F21V 19/0035* (2013.01); *F21V 19/04* (2013.01); *F21V 17/107* (2013.01); *F21Y 2115/10* (2016.08)

(58) Field of Classification Search
CPC .... F21V 19/003; F21V 19/0035; F21V 19/04; F21V 17/105; F21V 17/107; F21V 17/18
See application file for complete search history.

(56) References Cited

FOREIGN PATENT DOCUMENTS

| | | | | | |
|---|---|---|---|---|---|
| CN | 106764657 | A | * | 5/2017 | ............ F21V 17/164 |
| CN | 209084521 | U | * | 7/2019 | .............. F21V 17/16 |
| CN | 110397870 | A | * | 11/2019 | ................ F21S 8/00 |
| CN | 211551510 | U | * | 9/2020 | .............. F21V 17/10 |
| KR | 20180090077 | A | * | 8/2018 | ............ F21V 17/105 |

OTHER PUBLICATIONS

Ma Zhi-ping et al., "An LED Lamp", Sep. 22, 2020, EPO Espacenet Patent Translate, English translation of document "CN 211551510 U", 13 pages. (Year: 2020).*

Fu Shaouhua et al., "An LED Lamp, Nov. 1, 2019, EPO Espacenet Patent Translate, English translation of document "CN 110397870 A, 14 pages. (Year: 2019).*

(Continued)

*Primary Examiner* — Alan B Cariaso

(57) ABSTRACT

The disclosure discloses an LED lamp including a lamp holder, an LED lamp board, a light transmitting element and a pressing member, the LED light board is arranged on the lamp holder, and the light transmitting element covers the LED light board; the pressing member is arranged on one side of the light transmitting element away from the LED light board; the pressing member includes a first end and a second end; the first end is hinged with the lamp holder, the second end is buckled with the lamp holder to fix the light transmitting element on the lamp holder. A lamp holder assembly is also provided. The disclosure can conveniently install or replace the light transmitting element by the pressing member.

15 Claims, 6 Drawing Sheets

(56) References Cited

OTHER PUBLICATIONS

Jo Moo Ho, "A Tunnel Lighting Device With Laser Light", Aug. 10, 2018, Image document "KR 20180090077 A" merged with English translation text, 13 pages of image document merged with English text. (Year: 2018).*
Chu, Xiao-dong, "LED Spotlight", May 31, 2017, Image document "CN 106764657 A" merged with English translation text, 8 pages of image document merged with English text. (Year: 2017).*

* cited by examiner

LED LAMP AND LAMP HOLDER ASSEMBLY

CROSS-REFERENCE TO RELATED APPLICATION

This application claims the benefit of priority from Chinese Patent Application No. 202322769902.9 entitled "LED LAMP" and filed on Oct. 6, 2023, the content of which is hereby incorporated by reference in its entire by reference.

TECHNICAL FIELD

The present disclosure generally relates to the technical field of a lighting fixture, in particular to an LED lamp and a lamp holder assembly.

BACKGROUND

LED lamps usually include a lamp holder, an LED light board installed on the lamp holder, a light transmitting element or other optical components covering the LED light board. The light transmitting element can be a lens board. The lens board on the LED light is mainly connected to the lamp holder by fitting screws, and due to more screws, a screwdriver is needed, which is inefficient and inconvenient in the installation or replacement of the lens board. Therefore, it is necessary to make further improvements to the existing LED lamps.

SUMMARY

The present disclosure aims to provide an LED lamp and a lamp holder assembly for convenient installation or replacement of a light transmitting element.

The above technical items of the present disclosure are realized through the following technical schemes:

An LED lamp includes a lamp holder, an LED light board and a light transmitting element; wherein the LED light board is arranged on the lamp holder, and the light transmitting element covers the LED light board; the LED lamp further includes a pressing member, and the pressing member is arranged on one side of the light transmitting element away from the LED light board; the pressing member includes a first end and a second end; the first end is hinged with the lamp holder, the second end is buckled with the lamp holder to fix the light transmitting element on the lamp holder; and wherein the LED lamp further includes a buckle assembly, the buckle assembly is arranged on the second end; the second end of the pressing member is fixed on the lamp holder by buckling the buckle assembly and the lamp holder; and wherein the buckle assembly includes a hook; a groove cavity is defined on the second end of the pressing member, the hook is rotatably mounted in the groove cavity; a first through hole is defined on a bottom wall of the groove cavity; a second through hole is defined in the lamp holder corresponding to the first through hole; the hook is passing through the first through hole and the second through hole, and is fastened to the lamp holder; and wherein the hook includes a first hook part, a limit part and a first rotating shaft threaded at the joint of the first hook part and the limit part; the first hook part passes through the second through hole, and is buckled to the lamp holder; the first rotating shaft is hinged with the pressing member; wherein the buckle assembly further includes a limit button received in the groove cavity; the limit button includes a second rotating shaft and a second hook part; the limit button hinged to the pressure member through the second rotating shaft; the limit part is inserted into the second hook part to position the hook.

In some embodiments, the limit part includes a first guide slope near to the limit button, the second hook part includes a second guide slope matching with the first guide slope.

In some embodiments, the buckle assembly further includes a first torsion spring arranged around the first rotating shaft and a second torsion spring arranged around the second rotating shaft; one end of the first torsion spring is in contacted with a bottom wall of the groove cavity, and the other end of the first torsion spring is in contacted with the hook; when the first torsion spring is compressed, the first hook part hooks the lamp holder; one end of the second torsion spring is also in contacted with the bottom wall of the groove cavity, and the other end of the first torsion spring is in contacted with the limit button; when the second torsion spring is compressed, the second hook part hooks the limit part; the hook is fastened to the lamp holder by elastic force of the first torsion spring and the second torsion spring to fix the pressing member on the lamp holder.

In some embodiments, buckle assembly further includes a locking member movably connected to the hook to lock the first torsion spring in compression state or unlock the first torsion spring in the compression state.

In some embodiments, the locking member is exposed from the hook, and an adjustment groove is defined on an exposed surface the locking member for tool insertion and rotating the locking member.

In some embodiments, a position hole is defined on a side wall of the groove cavity corresponding to the lock member; when the locking member moves into the limiting hole, the locking member locks the compression state of the first torsion spring; when the locking member moves out of the limiting hole, the locking member releases the locking of the compression state of the first torsion spring.

In some embodiments, the pressing member is frame-shaped, the groove cavity and the buckle assembly are arranged on the second end of the pressing member; a number of the groove cavities, a number of the hooks and a number of the limit buttons are all two.

In some embodiments, a card slot is defined on a surface of the lamp holder away from the pressing member, and an end of the hook is fastened into the card slot.

In some embodiments, a plurality of adsorption sheets are arranged on the lamp holder; a plurality of magnetic parts are fixed on the light transmitting element; the magnetic parts pass through the LED light board; the magnetic parts are directly faced to and corresponding to the adsorption sheets to magnetically attract the light transmitting element plate on the lamp holder.

An LED lamp holder assembly, including a lamp holder, a pressing member and a buckle assembly; wherein one end of the pressing member is hinged with the lamp holder to rotate relative to the lamp holder; the buckle assembly is arranged on the other end of the pressing member to fasten the pressing member to the lamp holder; a gap is defined between the lamp holder and the pressing member for clamping an optical member; and wherein the buckle assembly includes a hook; the hook includes a first hook part and a limit part connected to the first hook part; the limit part is arranged on the pressing member; the first hook part passes through the pressing member and the lamp holder, and buckles one side of the lamp holder away from the pressing member; and wherein the hook further includes a first rotating shaft; the first rotating shaft threaded at the joint of the first hook part and the limit part; the first rotating shaft is hinged to the pressing member to rotate the hook relative to the pressing member.

In some embodiments, the buckle assembly further includes a limit button; the limit button includes a second hook part and a second rotating shaft threading the second hook part; the limit button hinged to the pressure member to rotate the second hook part relative to the pressing member; the limit part is inserted into the second hook part to position the hook.

In some embodiments, the limit part comprises a first guide slope near to the limit button; the second hook part includes a second guide slope matching with the first guide slope.

In some embodiments, the buckle assembly further includes a first torsion spring arranged around the first rotating shaft and a second torsion spring arranged around the second rotating shaft; one end of the first torsion spring is in contacted with the pressing member, and the other end of the first torsion spring is in contacted with the hook; when the first torsion spring is compressed, the first hook part hooks the lamp holder; one end of the second torsion spring is also in contacted with the pressing member, and the other end of the first torsion spring is in contacted with the limit button; when the second torsion spring is compressed, the second hook part hooks the limit part to prevent the expanding of the first torsion spring.

In some embodiments, a groove cavity is defined on a surface of the pressing member away from the lamp holder; a first through hole is defined in a bottom wall of the groove cavity; and a second through hole is defined in the lamp holder corresponding to the first through hole; the limit part is received in the groove cavity; the first hook part passes through the first through hole and the second through hole, and is fastened to the lamp holder; the limit button is also received in the groove cavity; one end of the first torsion spring and one end of the second torsion spring are all in contact with the bottom wall of the groove cavity.

In some embodiments, the buckle assembly further includes a locking member, the locking member is movably connected to the limit part; a limiting hole is defined on a side wall of the groove cavity corresponding to the locking member; when the locking member moves into the limiting hole, the locking member is locked on the compression state of the first torsion spring; when the locking member moves out of the limiting hole, the locking member releases the locking of the compression state of the first torsion spring.

Comparing with the related art, advantages of the present disclosure include the followings:

The light transmitting element can be manually fixed on the lamp holder by setting the pressing member and the buckle assembly, which is convenient and in high efficiency;

By setting the adsorption sheet and the magnetic part, the light transmitting element can be connected to the lamp holder in advance before the buckle assembly is fastened, and then it can be pressed and fixed by the pressing member and the buckle assembly. At the same time, a number of magnetic parts are arranged space with each other to support the light transmission parts at multiple points, which can prevent the heat deformation of the light transmission parts, so as to ensure the optical performance of the LED lamp.

DRAWINGS DESCRIPTION

DETAILED DESCRIPTION

Figure 1:
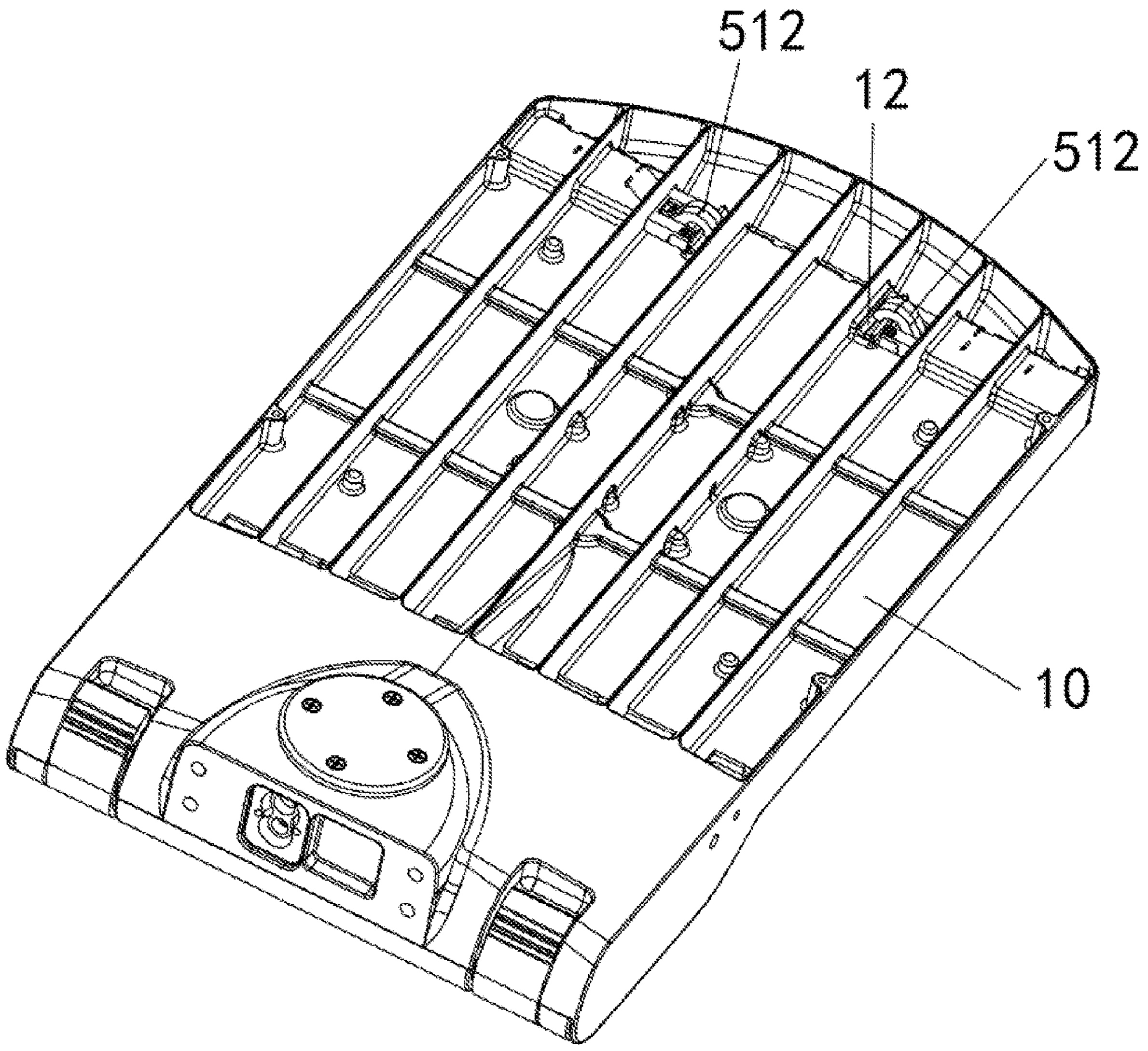
FIG. 1 is stereogram 1 of a LED lamp according to an embodiment of the present disclosure.

The following is a clear and complete description of the technical scheme in the embodiments of the present disclosure in combination with the drawings attached to the embodiments of the present disclosure. Obviously, the described embodiments are only some embodiments of the present disclosure, but not the whole embodiments. Based on the embodiments of the present disclosure, all other embodiments obtained by ordinary technicians in the field without making creative labor will fall within the scope of protection of the present disclosure.

Some embodiments of the present disclosure, referred to FIGS. 1 to 9, an LED lamp includes a lamp holder 10, an LED lamp board 20, a light transmitting element 30, a pressing member 40, and a buckle assembly 50. The LED light board 20 is arranged on front surface of the lamp holder 10. The light transmitting element 30 is arranged on lighting side of the LED light board 20, and covers the LED light board 20. The pressing member 40 is arranged on one side of the light transmitting element 30 away from the LED light board 20. That is part region of the light transmitting element 30 is closely sandwiched between the pressing member 40 and the lamp holder 10. The pressing member 40 includes a first end 41 and a second end 42 opposite to the first end 41. The first end 41 is hinged with the lamp holder 10 so that the pressing member 40 can be turned on or off. The second end 42 of the pressing member 40 is buckled with the lamp holder 10 to fix the light transmitting element 30 on the lamp holder 10. The buckle assembly 50 is arranged on the second end 42 of the pressing member 40 and is used for fixing the pressing member 40 on the lamp holder 10 and positioning the light transmitting element assembly 30.

That is, a gap is formed between the lamp holder 10 and the pressing member 40, which is used for clamping and positioning the light transmitting element 30. What we can describe in other word is that: a lamp holder assembly includes the lamp holder 10, the pressing member 40 and the buckle assembly 50, which can be used for clamping an optical component similar to the light transmitting element 30. It can be understood that the optical component are not limited to shading parts, light guides, splitting parts, and so on.

Referred to FIGS. 5 to 9, the buckle assembly 50 includes a hook 51 and a limit button 52. A groove cavity 43 is defined on the second end 42 of the pressing member 40, and the hook 51 and the limit button 52 are rotatably mounted in the groove cavity 43. A first through-hole 432 is defined on a bottom wall 431 of the groove cavity 43. A second through-hole 11 is defined on the lamp holder 10 aligned with the first through-hole 432. The hook 51 is passing through the first through-hole 432 and the second through-hole 11, and fastened to the lamp holder 10. A card slot 12 is defined on a surface of the lamp holder 10 away from the pressing member 40, and an end of the hook 51 is received in the card slot 12 to fix the light transmitting element 30 on the lamp holder 10.

Figure 5:
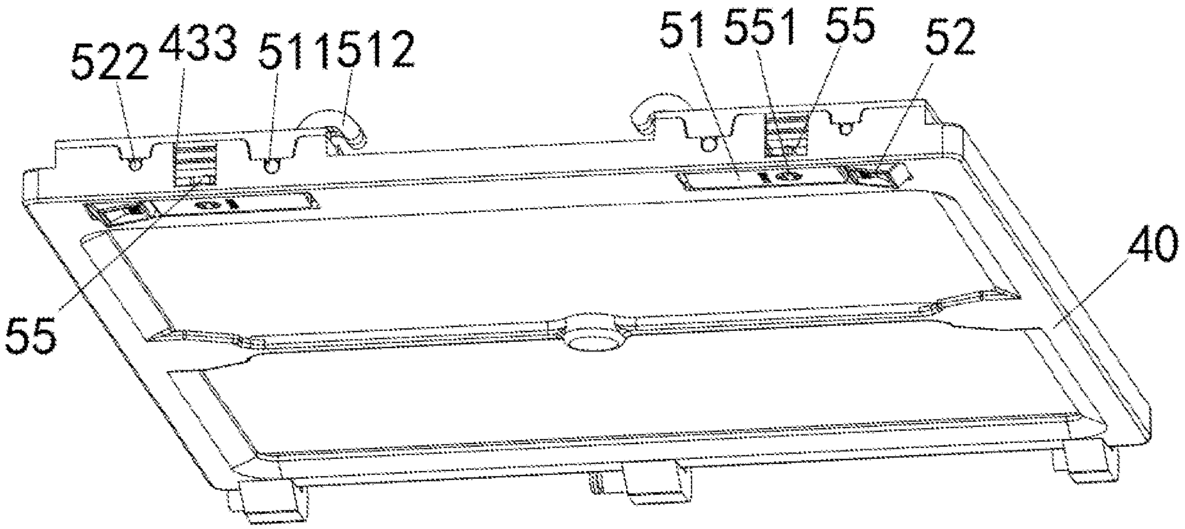
FIG. 5 is a stereogram of the pressing member and the buckle assembly according to an embodiment of the present disclosure.
Figure 6:
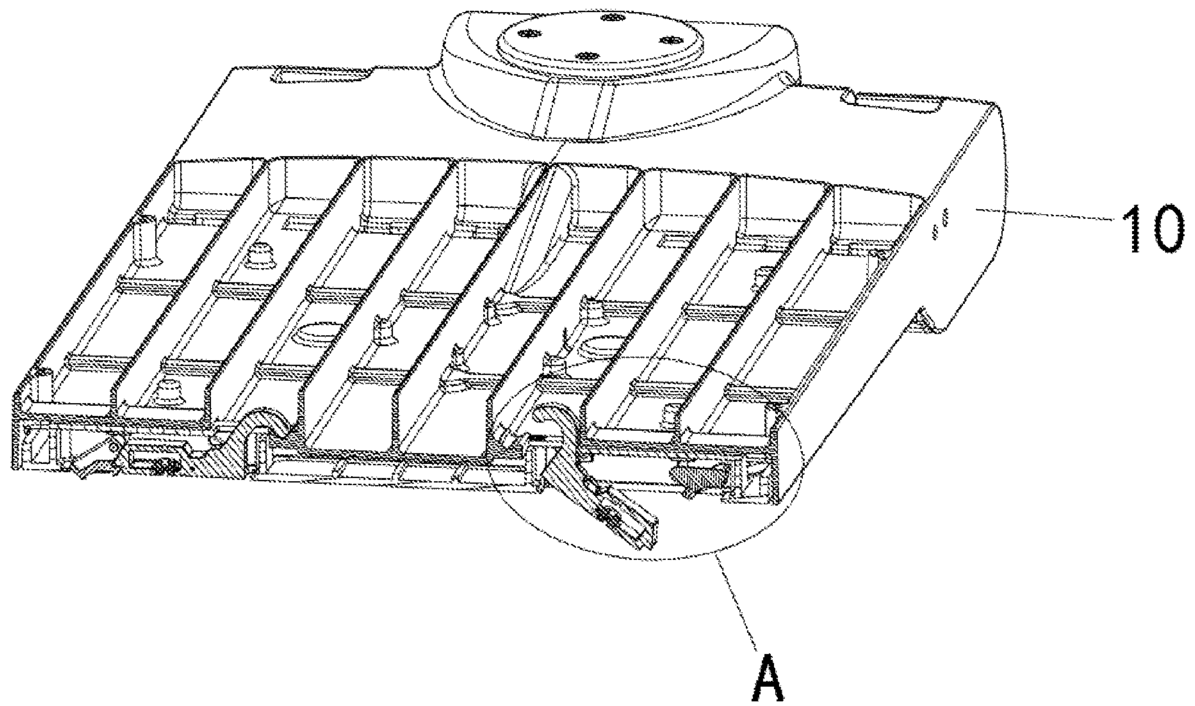
FIG. 6 is a section view of the LED lamp according to an embodiment of the present disclosure.
Figure 7:
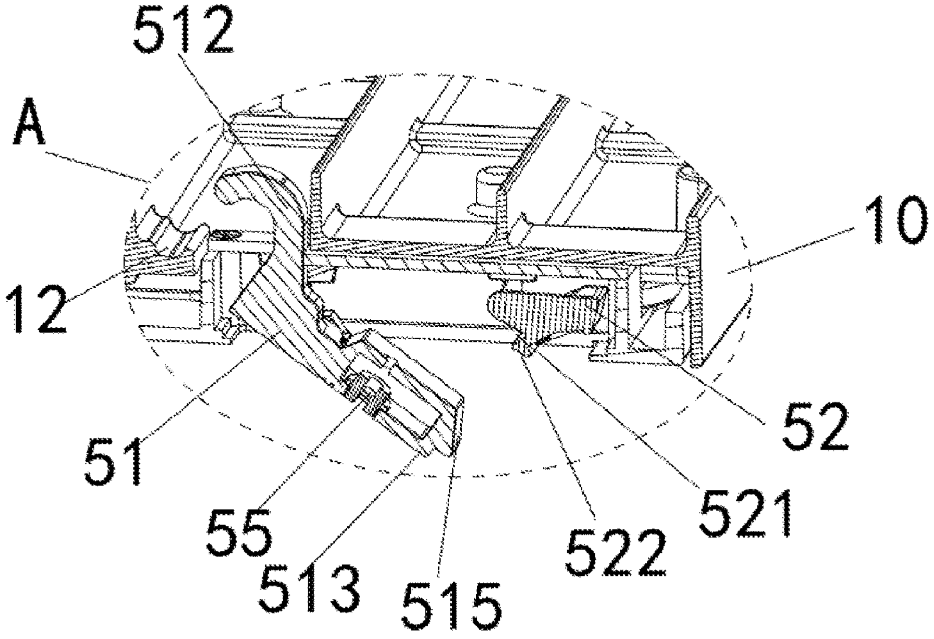
FIG. 7 is the enlarged diagram on A in FIG. 6.

Referred to FIGS. 5 to 7, the hook 51 includes a first hook part 512, a limit part 513, and a first rotating shaft 511 threaded at the joint of the first hook part 512 and the limit part 513. The first hook part 512 and the limit part 513 are located on two opposite sides of the first rotating shaft 511. The first hook part 512 and the limit part 513 can be integrally connected. The first hook part 512 is passing through the first pass hole 432 and the second pass hole 11 and is buckled to the lamp holder 10. The first rotating shaft 511 is hinged to the pressing member 40 so that the hook 51 can be rotated around the first rotating shaft 511. The limit button 52 includes a second rotating shaft 522 and a second hook part 521. The second hook part 521 is arranged near to the hook 51, and the limit button 52 is hinged to the pressing member 40 through the second rotating shaft 522. The limit part 513 of the hook 51 is inserted into the second hook part 521 to position the hook 51.

Figure 8:
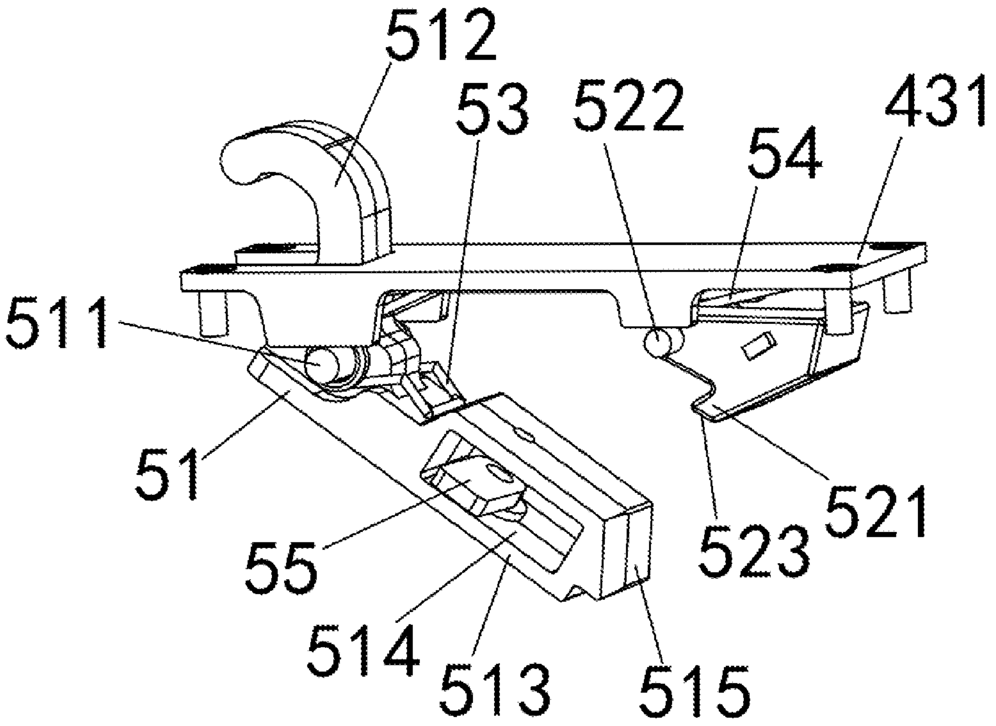
FIG. 8 is a non-buckled state diagram of the buckle assembly according to an embodiment of the present disclosure.
Figure 9:
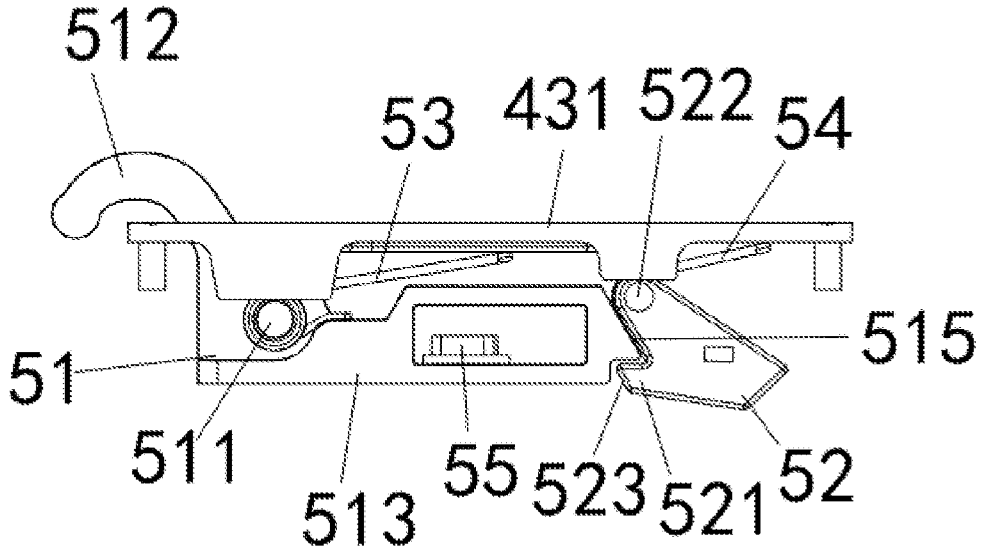
FIG. 9 is the buckled state diagram of the buckle assembly according to an embodiment of the present disclosure.

Referred to FIGS. 8 to 9, the buckle assembly 50 further includes a first torsion spring 53 and a second torsion spring 54. The first torsion spring 53 is arranged around the first rotating shaft 511, and one end of the first torsion spring 53 is in contacted with a bottom wall 431 of the groove cavity 43, and the other end of the first torsion spring 53 is in contacted with the hook 51. When the first torsion spring 53 is compressed, the first hook part 512 hooks the lamp holder 10, and when the first torsion spring 53 is in an expansion state, the first hook part 512 is detached from the lamp holder 10. The second torsion spring 54 is arranged around the second rotating shaft 522, and one end of the second torsion spring 54 is also in contacted with the bottom wall 431 of the groove cavity 43, and the other end of the second torsion spring 54 is in contacted with the limit button 52 to press the limit part 513 by the second hook part 521 of the limit button 52. When the second torsion spring 54 is in a compression state, the second hook part 521 hooks the limit part 513, and under the elastic force of the second torsion spring 54, the limit button 52 presses the limit part 513 of the hook part 51, so as to position the hook part 51. When the second torsion spring 54 is in an expansion state, the second hook part 521 and the limit part 513 are detached. This disclosure uses the elasticity of the first torsion spring 53 and the second torsion spring 54 to fasten the pressing member 40 on the lamp holder 10, and then position the light transmitting element 30, which can realize the manual installation of the light transmitting element 30 without a screwdriver, this operation is simple and convenient, and the replacement of the light transmitting element 30 is convenient.

Referred to FIGS. 7 to 9, in this embodiment, the limit part 513 includes a first guide slope 515 near to the limit button 52, and the hook part 521 includes a second guide slope 523 near to and matching with the first guide slope 515. By matching the first guide slope 515 and the second guide slope 523, the buckle assembly 50 is easily fastened.

When the pressing member 40 is in a buckle state, the second torsion spring 54 and the first torsion spring 53 are in the compression state. Opening the pressing member 40 needs to press the limit button 52 away from the end of the hook 51, and turn the limit button 52, then the second hook part 521 of the limit button 52 and the limit part 513 of the hook 51 can be separated. Without the limit of the limit button 52, the hook 51 is opened under the action of the first torsion spring 53, and the first hook part 512 of the hook 51 is detached from the lamp holder 10 to release the buckle state; then the second end 42 of the pressing member 40 can be lifted and rotated, so that the light transmission element 30 can be taken out manually. When there is need to buckle the pressing member 40, the light transmitting element 30 can be positioned, then the second end 42 of the pressing member 40 can be turned down, the limit part 513 can be pressed, and the first guide slope 515 of the limit part 513 can be slid into the second hook part 521 along the second guide slope 523 of the second hook part 521, then the limit part 513 can be hooked by the second hook part 521 of the limit button 52, then the hook 51 can be positioned.

Referred to FIGS. 2 and 5 to 9, In some embodiments, the buckle assembly 50 further includes a locking member 55, which is arranged to prevent the light transmitting element 30 and the LED light board 20 falling off when the limit button 52 is pressed by mistake. The locking member 55 is movably connected to the hook 51 to lock the first torsion spring 53 in the compression state or unlock the first torsion spring 53 in the compression state. The pressing member 40 can only be opened by pressing the limit button 52 when the locking member 55 is in an unlocked compression state. The locking member 55 is rotatably connected with the hook 51. An accommodating cavity 514 is defined on the hook 51, and the locking member 55 is rotatably arranged in the accommodating cavity 514. A position hole 433 corresponding to the accommodating cavity 514 and the locking member 55 is defined on a side wall of the groove cavity 43. If the locking member 55 is rotated into the limiting hole 433, the locking member 55 is locked (that is, the first torsion spring 53 is in a locked compression state). Specifically, the locking member 55 can be rotated to and extended into the limiting hole 433. If the limit button 52 is loosened, a wall of the limiting hole 433 blocks the locking member 55 to limit the rotation of the limit part 513, so that the first torsion spring 53 on the locking member 55 is compressed and cannot be loosened, then the locking member 55 is locked (that is, the first torsion spring 53 is in a locked compression state) to maintain the hook 51 buckled to the lamp holder 10. When the locking member 55 moves out of the limiting hole 433, and the limit button 52 is loosened, the locking member 55 can release the locking of the compression state of the first torsion spring 53, then the locking member 55 is unlocked (that is, the first torsion spring 53 is in an unlocked compression state).

Figure 2:
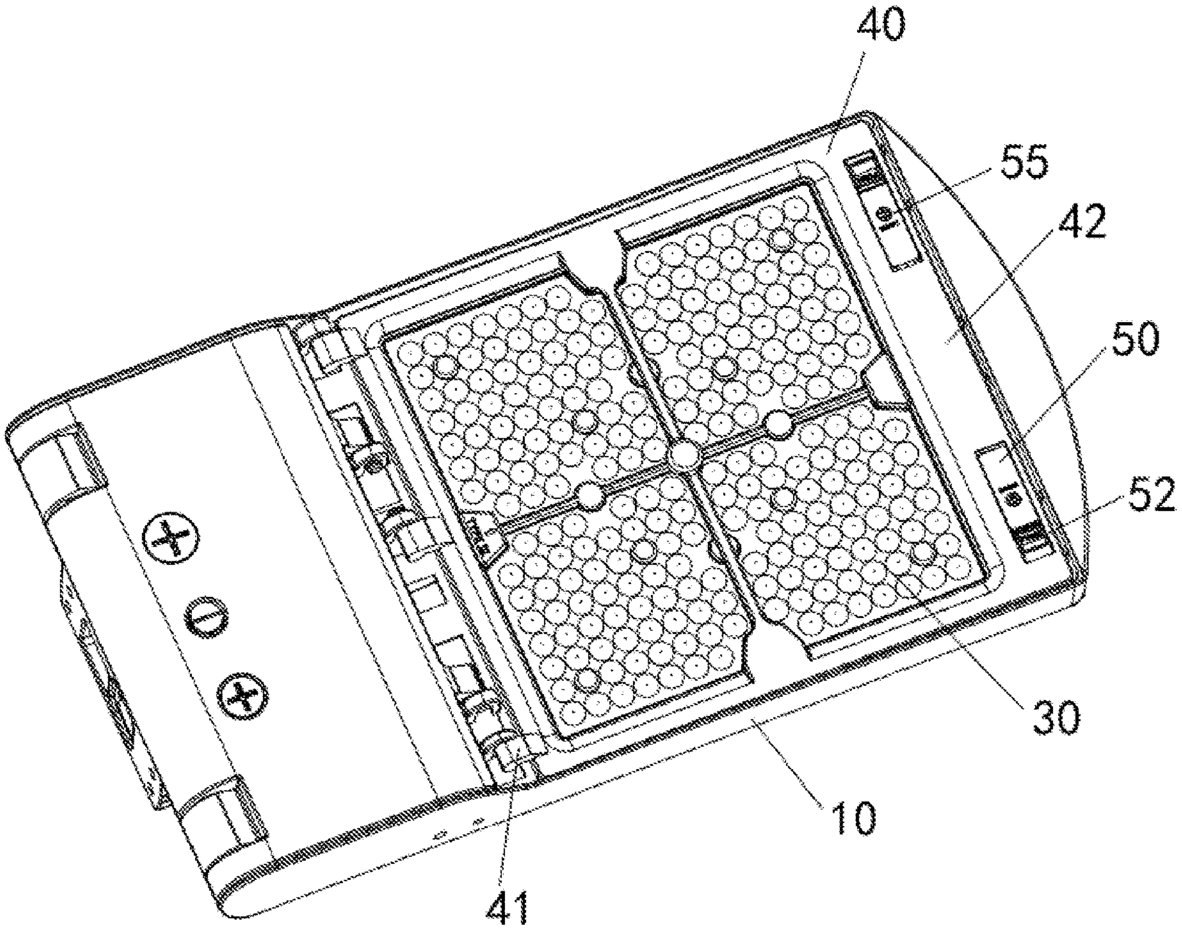
FIG. 2 is stereogram 2 of the LED lamp according to an embodiment of the present disclosure.

Referred to FIG. 2, in some embodiments, the locking member 55 is exposed from the hook 51, and an adjustment groove 551 is defined on an exposed surface the locking member 55, which is used for inserting a tool (such as a screwdriver) to turn the locking member 55 rotate, thus to switch between the locking compression state and the unlocking compression state.

In this embodiment, the pressing member 40 is frame-shaped, and in order to ensure the stability of the device, the number of buckle assembly 50 is two, and the groove cavities 43 are also arranged in two, and each buckle assembly 50 is respectively received in one corresponding groove cavity 43. In the present embodiment, the pressing member 40 is square frame-shaped, and it is understood by those skilled in the art that the pressing member 40 that the pressing member 40 may not be limited to pictorial shapes, but may also be framed or reticulated in other shapes, such as circles, ellipses, polygons, etc.

Figure 3:
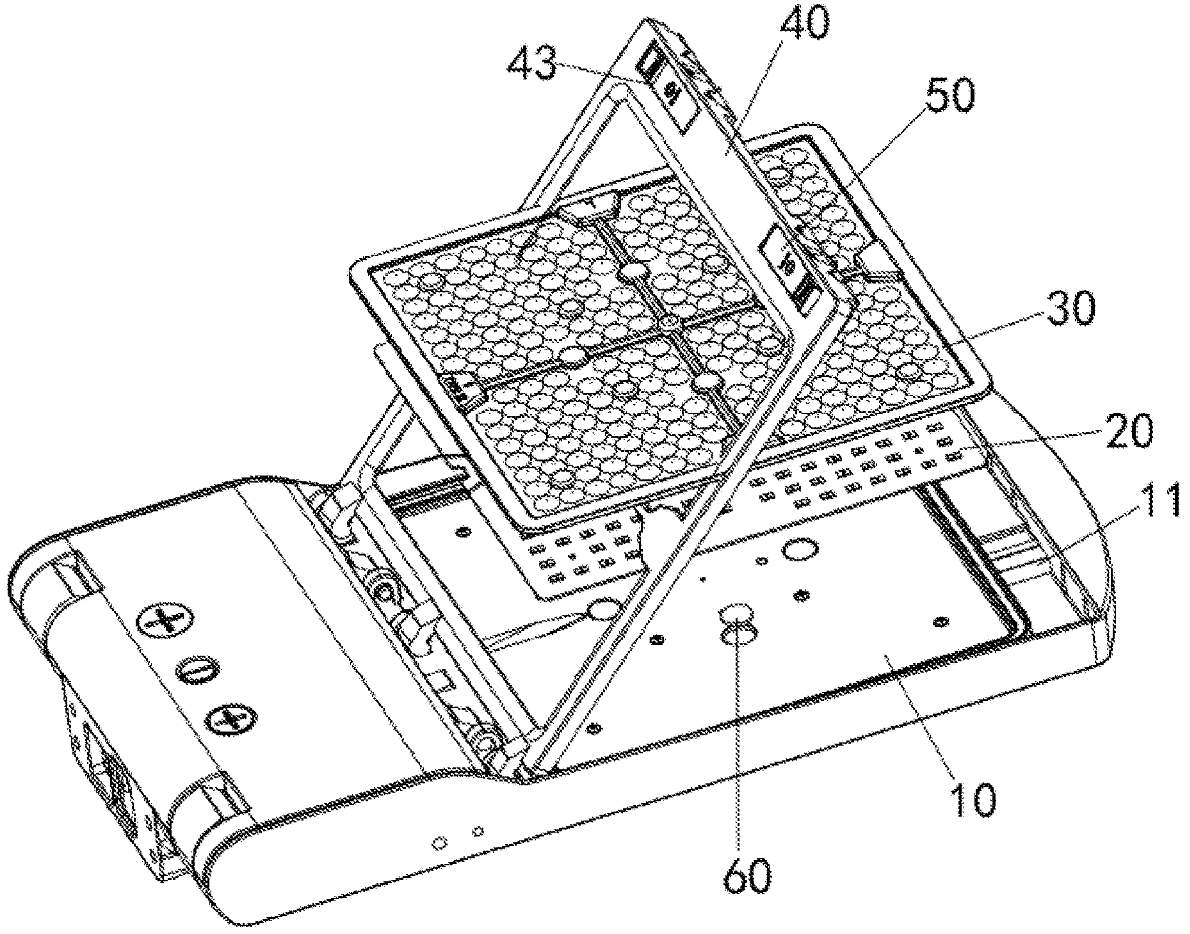
FIG. 3 is stereoscopic explosion diagram 1 of the LED lamp according to an embodiment of the present disclosure.
Figure 4:
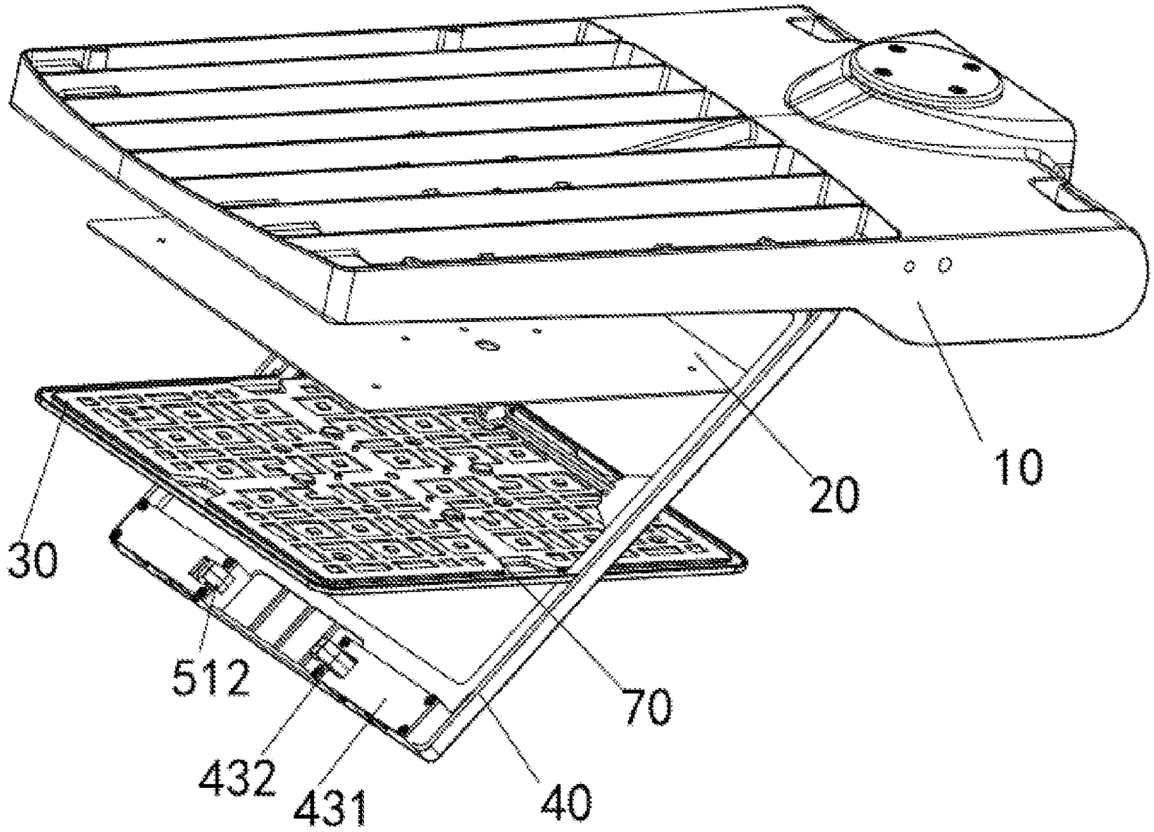
FIG. 4 is stereoscopic explosion diagram 2 of the LED lamp according to an embodiment of the present disclosure.

Referred to FIGS. 3 to 4, in some embodiments, a plurality of adsorption sheets 60 are arranged on the lamp holder 10. A plurality of magnetic parts 70 is fixed on the light transmitting element 30. A plurality of through holes is defined on the LED light board 20 respectively corresponding to the plurality of magnetic parts 70. Each of the magnetic part 70 passes through a corresponding through hole of the LED light board to directly face to one corresponding adsorber 60, through the magnetic force between the adsorption sheets 60 and the magnetic parts 70, the transparent element 30 is magnetically attracted to the lamp holder 10 for convenient installation of the light transmitting element 30. There are a plurality of adsorption sheets 60 and a plurality of magnetic parts 70, and a plurality of magnetic parts 70 are spaced from each other, which can prevent deformation of the light transmission part 30 due to heat given off by the LED light board 20.

Although embodiments of the invention have been shown and described, it is understandable to a person of ordinary skill in the art that these embodiments may be varied, modified, replaced, and modified in a variety of ways without deviating from the principle and spirit of the invention, and that the scope of the invention is limited by the attached claims and their equivalents.

What is claimed is:

1. An LED lamp comprises a lamp holder, an LED light board and a light transmitting element; wherein the LED light board is arranged on the lamp holder, and the light transmitting element covers the LED light board;

the LED lamp further comprises a pressing member, and the pressing member is arranged on one side of the light transmitting element away from the LED light board;

the pressing member comprises a first end and a second end; the first end is hinged with the lamp holder, the second end is buckled with the lamp holder to fix the light transmitting element on the lamp holder; and wherein the LED lamp further comprises a buckle assembly, the buckle assembly is arranged on the second end; the second end of the pressing member is fixed on the lamp holder by buckling the buckle assembly and the lamp holder; and wherein the buckle assembly comprises a hook; a groove cavity is defined on the second end of the pressing member, the hook is rotatably mounted in the groove cavity; a first through hole is defined on a bottom wall of the groove cavity; a second through hole is defined in the lamp holder corresponding to the first through hole; the hook is passing through the first through hole and the second through hole, and is fastened to the lamp holder; and wherein the hook comprises a first hook part, a limit part and a first rotating shaft threaded at a joint of the first hook part and the limit part; the first hook part passes through the second through hole, and is buckled to the lamp holder; the first rotating shaft is hinged with the pressing member;

wherein the buckle assembly further comprises a limit button received in the groove cavity; the limit button comprises a second rotating shaft and a second hook part; the limit button hinged to the pressure member through the second rotating shaft;

the limit part is inserted into the second hook part to position the hook.

2. The LED lamp of claim 1, wherein the limit part comprises a first guide slope near to the limit button, the second hook part comprises a second guide slope matching with the first guide slope.

3. The LED lamp of claim 1, wherein the buckle assembly further comprises a first torsion spring arranged around the first rotating shaft and a second torsion spring arranged around the second rotating shaft;

one end of the first torsion spring is in contacted with a bottom wall of the groove cavity, and the other end of the first torsion spring is in contacted with the hook; when the first torsion spring is compressed, the first hook part hooks the lamp holder;

one end of the second torsion spring is also in contacted with the bottom wall of the groove cavity, and the other end of the first torsion spring is in contacted with the limit button; when the second torsion spring is compressed, the second hook part hooks the limit part;

the hook is fastened to the lamp holder by elastic force of the first torsion spring and the second torsion spring to fix the pressing member on the lamp holder.

4. The LED lamp of claim 3, wherein buckle assembly further comprises a locking member movably connected to the hook to lock the first torsion spring in compression state or unlock the first torsion spring in the compression state.

5. The LED lamp of claim 4, wherein the locking member is exposed from the hook, and an adjustment groove is defined on a exposed surface the locking member for tool insertion and rotating the locking member.

6. The LED lamp of claim 4, a position hole is defined on a side wall of the groove cavity corresponding to the lock member; when the locking member moves into the limiting hole, the locking member locks the compression state of the first torsion spring;

when the locking member moves out of the limiting hole, the locking member releases the locking of the compression state of the first torsion spring.

7. The LED lamp of claim 1, wherein the pressing member is frame-shaped, the groove cavity and the buckle assembly are arranged on the second end of the pressing member; a number of the groove cavities, a number of the hooks and a number of the limit buttons are all two.

8. The LED lamp of claim 1, wherein a card slot is defined on a surface of the lamp holder away from the pressing member, and an end of the hook is fastened into the card slot.

9. The LED lamp of claim 1, wherein a plurality of adsorption sheets are arranged on the lamp holder; a plurality of magnetic parts are fixed on the light transmitting element; the magnetic parts pass through the LED light board; the magnetic parts are directly faced to and corresponding to the adsorption sheets to magnetically attract the light transmitting element plate on the lamp holder.

10. An LED lamp holder assembly, comprising a lamp holder, a pressing member and a buckle assembly; wherein one end of the pressing member is hinged with the lamp holder to rotate relative to the lamp holder;

the buckle assembly is arranged on another end of the pressing member to fasten the pressing member to the lamp holder;

a gap is defined between the lamp holder and the pressing member for clamping an optical member; and wherein the buckle assembly comprises a hook; the hook comprises a first hook part and a limit part connected to the first hook part; the limit part is arranged on the pressing member; the first hook part passes through the pressing member and the lamp holder, and buckles one side of the lamp holder away from the pressing member; and wherein the hook further comprises a first rotating shaft; the first rotating shaft threaded at the joint of the first hook part and the limit part; the first rotating shaft is hinged to the pressing member to rotate the hook relative to the pressing member.

11. The LED lamp holder assembly of claim 10, wherein the buckle assembly further comprises a limit button; the limit button comprises a second hook part and a second rotating shaft threading the second hook part; the limit button hinged to the pressure member to rotate the second hook part relative to the pressing member; the limit part is inserted into the second hook part to position the hook.

12. The LED lamp holder assembly of claim 11, wherein the limit part comprises a first guide slope near to the limit button; the second hook part comprises a second guide slope matching with the first guide slope.

13. The LED lamp holder assembly of claim 11, wherein the buckle assembly further comprises a first torsion spring arranged around the first rotating shaft and a second torsion spring arranged around the second rotating shaft;

one end of the first torsion spring is in contacted with the pressing member, and the other end of the first torsion spring is in contacted with the hook; when the first torsion spring is compressed, the first hook part hooks the lamp holder;

one end of the second torsion spring is also in contacted with the pressing member, and the other end of the first torsion spring is in contacted with the limit button; when the second torsion spring is compressed, the second hook part hooks the limit part to prevent the expanding of the first torsion spring.

14. The LED lamp holder assembly of claim 13, wherein a groove cavity is defined on a surface of the pressing member away from the lamp holder; a first through hole is defined in a bottom wall of the groove cavity; and a second through hole is defined in the lamp holder corresponding to the first through hole; the limit part is received in the groove cavity; the first hook part passes through the first through hole and the second through hole, and is fastened to the lamp holder; the limit button is also received in the groove cavity; one end of the first torsion spring and one end of the second torsion spring are all in contact with the bottom wall of the groove cavity.

15. The LED lamp holder assembly of claim 13, wherein the buckle assembly further comprises a locking member, the locking member is movably connected to the limit part; a limiting hole is defined on a side wall of the groove cavity corresponding to the locking member; when the locking member moves into the limiting hole, the locking member is locked on the compression state of the first torsion spring; when the locking member moves out of the limiting hole, the locking member releases the locking of the compression state of the first torsion spring.

* * * * *